June 23, 1925.

C. S. ELLIS 1,543,069

AUTOMATIC TOASTER

Filed April 5, 1924

Inventor.
Charles S. Ellis.

Patented June 23, 1925.

1,543,069

UNITED STATES PATENT OFFICE.

CHARLES S. ELLIS, OF CHICAGO, ILLINOIS.

AUTOMATIC TOASTER.

Application filed April 5, 1924. Serial No. 704,342.

*To all whom it may concern:*

Be it known that I, CHARLES S. ELLIS, a citizen of the United States, and a resident of Chicago, in the county of Cook and State of Illinois, have invented certain new and useful Improvements in Automatic Toasters; and I do hereby declare that the following is a full, clear, and exact description thereof, reference being had to the accompanying drawings, and to the characters of reference marked thereon, which form a part of this specification.

This invention relates to improvements in automatic toasters of that general type in which the bread carrier, after a predetermined toasting period, and controlled by a timing mechanism, is moved away from the toasting zone so as to carry the bread slice with it and thus automatically time the toasting period.

The invention is herein shown as adapted to a type of toaster embodying a toasting chamber in which both sides of a slice of bread are simultaneously toasted, but the essence of the invention may be embodied in types of toasters wherein the bread slice is held, as by a suitable grid, in proper relation to a heating or toasting unit and in which but one side of a slice is toasted at a time; the latter form of toaster usually employing bi-lateral toasting units.

An object of the invention is to provide a novel system of levers to connect and suspend the carrier on an overhead support associated with a toasting unit, so that the carrier will remain in both its toasting and toast discharging positions in a substantially horizontal position. This arrangement simplifies the movements of the carrier; avoids binding of the carrier connections, and maintains the carrier in stable holding-position for the toast slices.

A further object of the invention is to produce a toaster in which the carrier is thus suspended, wherein the connections are such that the carrier and the toast slice supported thereon are raised into position to be abreast the toasting zone for the toasting operation, and are lowered below the toasting zone when the carrier and supported toast slice moves into non-toasting position, whereby, after the toast is discharged, it is subject no more to toasting heat.

It is a further object of the present invention to produce an exceedingly simple carrier which is arranged to carry a toast slice on edge in all positions of the carrier and is connected to swing into and out of toasting position while carrying the toast on edge, with the side of the toast facing a toasting unit when the carrier is set in normal toasting position and there held by suitable connection with a timing device, the connection being so arranged that when the carrier is released from the timing device the carrier will be automatically swung out of the toasting zone by gravity of the carrier and its load to remove the toast slice from the toasting zone so that the toasted slice of bread will be removed from the heat of the toaster unit while remaining on edge and readily accessible for removal from the carrier.

A still further object of the invention is to provide a swinging automatic toaster which is swung into and out of a chamber bounded on opposite sides by toasting units, whereby both sides of a slice of bread are toasted simultaneously.

Other objects of the invention are to further improve and simplify toasters of this general character, and the principles of my invention are shown in the adaptation thereof to one embodiment of the invention, which invention is set out in the appended claims.

Figures 1, 2:
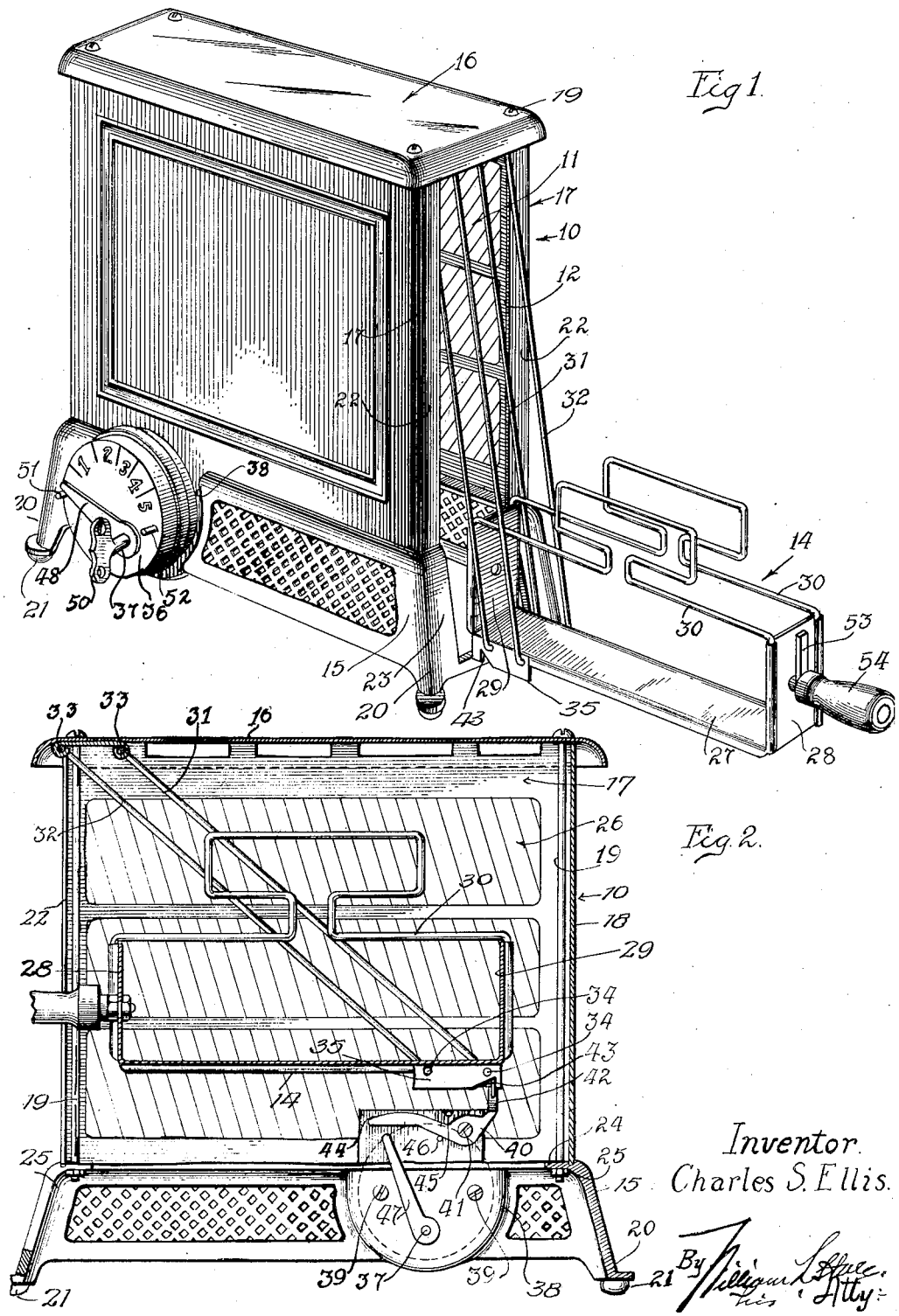
Figure 1 is a perspective view of an automatic toaster embodying my invention, showing the carrier in its toast delivering position.
Figure 2 is a vertical section of the toaster, showing the carrier in the toasting chamber.

The invention is herein shown as adapted to an electric toaster. In said embodiment, the general structure of the toaster comprises a frame in which is formed a vertical chamber on two opposite sides of which are arranged electric heating units adapted to be connected in any suitable manner to a source of current supply, said chamber having a vertical opening at one of its ends through which the carrier swings into and out of toasting position.

As shown in the drawings:

The toaster frame 10 is of general rectangular formation and encloses a toasting chamber 11 which opens through one end of the frame at an opening 12 which extends vertically from top to bottom of the frame. 14 designates as a whole the bread of the chamber 11 through the front opening 12.

The frame comprises a base portion 15; a cap portion 16; side plates 17, 17, and a rear plate 18, the latter integral with the side plates and all confined between the base and cap plate 16 by suitable bolts 19.

The base portion 15 may be made of cast metal and its side and rear ends may be integral with each other, the front wall of the base being cut away to include part of the front opening 11. Said base can be formed with suitable legs 20 equipped with resilient supporting tips 21 whereby it may be set on a finished surface without marking the latter.

The side and end plates 17, 18 may be made of sheet metal formed by suitable swaging operations to produce panel-like exterior faces. At the front of the toaster, the margins of said plates are turned inwardly to form flanges 22 and the base 15 at said front is formed with like flanges 23 in line with flanges 22 to produce a symmetrical front opening for the toasting chamber. The lower margins of said plates are set into upwardly opening grooves around the margins of the top of the base, as best shown in Figure 2, to produce an interlocking effect between the chamber bounding plates and said base. Said chamber bounding plates are confined in said grooves and between the base and the cap plate 16 by the bolts 19 which extend downwardly through the cap plate at the corners of the toasting chamber and through openings in inwardly turned ledges 24 just inside the plate-receiving grooves, the bolts being threaded at their lower ends to receive nuts 25 and being grooved at their heads, above the cap plate, to receive a screw driver to turn the bolts in the plates. Preferably, the side walls are notched beneath the top plate 16 to afford a desired circulation of air through the toasting chamber. On each side of the toaster chamber are mounted electric heating units of any suitable or preferred form, designated as a whole by 26, which are adapted to be connected in any suitable way, not shown, to a source of electrical energy.

The carrier 14 may be of any suitable form to support the bread slice in edgewise, vertical position so that when the carrier is in the toasting chamber, both sides thereof will be simultaneously exposed to the influence of the heating units. As shown, it comprises a sheet metal base 27 and front and rear upturned ends 28, 29, respectively, to which latter are connected light wires or rods 30 formed to constitute side supports for the bread slices.

The said carrier thus constructed is supported on the toaster structure in such a way that it is swingingly moved in a vertical plane into and out of the toasting chamber. Preferably, and as herein shown, the supporting connections between the toaster frame structure and the carrier are such as to maintain the carrier horizontal throughout all parts of its swinging movement. This may be effected by a parallel system of pivot rods or hangers 31, 32 arranged with one of the hangers of each pair in rear of the other, and with both of the hangers of each pair pivoted at fore and aft horizontal pivot members 33, 33 underneath the cap plate 16 and at like disposed pivot member 34, 34 on depending lips 35 on the carrier plate; the upper pivots 33 lying in the same plane and in a plane parallel to a plane in which the pivots 34 lie. This arrangement produces a parallel swinging link or suspending system which maintains the carrier horizontal throughout its swinging motion into and away from the toasting chamber. In Figure 1, the carrier is shown in its outermost or toast-delivering position, while, in Figure 2, it is shown within the toasting chamber with its bottom plate 27 disposed in a slightly higher plane due to said link suspending connection.

36 designates an escapement device of any usual or preferred type. It is enclosed in a circular casing and includes an eccentrically-disposed arbor 37 which is connected to the main spring of the escapement movement, not shown. The casing of said escapement device is shown as contained partially within a laterally facing recessed portion 38 of the side of the base and said casing may be fixed to the base in any suitable manner, as by screws 39 extending through the side wall of the base and into the back of the escapement casing.

40 designates a vertically swinging dog which is pivoted at 41 to a bracket that is formed as a part of one of the side walls of the base, and is located beneath the normal toasting position of the carrier. Said dog is provided at one end with an upstanding tooth 42 having a hard metal terminal which is adapted to engage the abrupt wall of a notch 43 formed on the lower rear margin of one of the flanges or lips 35 of the carrier. The said dog is balanced, as by a forwardly directed tail extension 44 to tend to maintain the tooth of the dog above the horizontal plane of the entering or open side of the notch 43; and the swinging movement of the dog about its pivot 41 is limited by upper and lower pins 45, 46.

Said escapement arbor 37 carries a radial arm 47 fixed thereto so that its outer end will swing in a short arcuate path. The said arm is below and in the vertical plane of the tail portion 44 of the dog. The balancing function of the dog on its pivot 41 normally holds the tooth 42 in position to engage with the abrupt wall of the notch 43 of the carrier. The forward edge of the notch is inclined for easy riding of the said notch portion over the dog, and the rear end of the notch constitutes an abrupt shoulder to engage the tooth of the dog, and to swing the dog for engagement with the understop pin 46 and thereby hold the carrier from swinging outwardly.

The escapement device includes also an indicator hand which sweeps over the outer flat face of the escapement mechanism casing and across the dial characters thereon, which may indicate minutes and fractions of minutes. Said indicator hand is fixed to rotate with the shaft 37, above referred to, that terminates at its outer end beyond the dial face of the casing with a key head 50, whereby upon rotational movement of the shaft 37 in a clockwise direction, the indicator hand 47 is caused to sweep across the dial characters and will be held from backward travel over the dial by the usual escapement mechanism which controls the main spring. 51, 52 designate terminal stop pins extending laterally from the side or dial face of the escapement mechnism casing. The pin 51 limits the unwinding movement of the indicator hand, while the pin 52 limits the winding movement thereof.

The parts are so arranged that when the indicator hand 48 is swung away from its back stop pin 51, the arm 47 swings away from the pivot 41 of the dog 40, and the balancing function of the dog will cause the tooth of said dog to rise up in position to engage the notch 43 of the carrier when the latter is moved into the toasting chamber. The main spring of the escapement mechanism, under the control of the usual escapement mechanism, unwinds the spring and causes the arm 47 to move toward the pivot of the dog. At the proper time, the end of said arm engages the tail of the dog to swing it on its pivot to release the holding tooth 42 from the carrier and thereby permit the carrier to swing outwardly into toast delivering position solely by gravity (as shown in Figure 1). It will be observed, therefore, that when the indicator hand 48 occupies the position shown in Figure 1, the arm 47 will be in position to act on the dog to release it from the carrier. When a slice of bread is to be toasted, it is placed in the carrier, the indicator hand 48 is swung across the dial to a position which indicates in minutes the time the bread is to be subjected to the toasting heat. Thereafter the carrier, with the bread slice thereon, will be swung into the toasting chamber and held therein by the dog 40; to be subsequently released by the arm 47 at the predetermined interval when toasting is finished.

When the toaster is not in use, and when, therefore, the dog will be in an inactive position to hold the carrier in the toasting chamber, said carrier may be locked in the chamber by means of a rotative stop arm 53 which is mounted on a carrier manipulating knob 54, said arm 53 being adapted to be swung, upon rotation of the knob, after the arm has passed inwardly beyond the plane of the flanges 42 and backwardly behind one of the flanges 22 to hold the carrier in place.

I claim as my invention:

1. A toaster comprising a frame, a toasting unit, a swinging toast carrier to support a toast slice edgewise, swingable into and out of toasting position, suspending connections between the upper side of said frame above said unit and said carrier to maintain the carrier horizontal throughout its swinging movement, and timing means to control movement of said carrier.

2. A toaster comprising a frame, a toaster unit, a swinging toast carrier swingable into and out of toasting position, including parallel link connections between said frame and carrier to hold said carrier horizontal throughout its swinging movement and inherently allowing said carrier to swing outwardly away from toasting position when unrestrained, and a timing device to control movement of said carrier relative to toasting position.

3. A toaster comprising a frame having a vertical toasting chamber vertically open at its end and having toasting units at its sides, and a carrier swingable through said vertical opening into and out of said chamber and swingable by gravity of its weight and load outwardly from said chamber, and escapement means to lock said carrier in its position within said chamber and cooperating with gravity to control swinging movement of said carrier.

4. A toaster comprising a chamber open at its end, and having toasting elements at its sides, a carrier swingably supported on the frame into and out of said chamber and to swing outwardly therefrom by gravity when unrestrained, and a timing device to hold the said carrier within said chamber and to control its outward swinging movement.

5. A toaster comprising a frame having opposed toaster units, a carrier swingably supported on said frame to swing into position between said units and to swing by gravity away therefrom and including a parallel system of suspension members pivoted to the upper front end of the frame and to the back end of said carrier, and timing means to hold said carrier between said units and to control outward swinging movement of the carrier.

6. A toaster comprising a frame having opposed toaster units, a carrier, parallel hangers pivoted to said frame and said carrier by means to cause the carrier to normally tend to swing away from said units, and timing means to control movement of said carrier.

7. A toaster comprising a frame having opposed toaster units, a carrier, parallel hanger rods pivoted in parallel relation to the upper side of said frame and to said carrier, and time-controlled means to temporarily hold said carrier between said units permitting the carrier to swing away from said units by gravity.

8. A toaster comprising a frame having opposed toaster units, a carrier, hanger rods pivoted in parallel relation to the upper forward side of said frame and at their lower ends to the rear end of said carrier, and timing means to hold said carrier between said units.

9. A toaster comprising a frame having opposed toaster units bounding a toasting position, a toast carrier and hanger rods pivoted in parallel relation at their upper ends to the upper forward side of said frame and at their lower ends to the rear end of said carrier to normally sustain the carrier by gravity away from toasting position and to swing said carrier into toasting position.

10. A toaster comprising a frame having opposed toaster units and having an opening for the passage of a carrier to toasting position between the units and away from said position, a carrier to support a toast slice edgewise in both toasting and non-toasting position, and hanger rods pivoted to said frame and to said carrier on which the carrier is carried into and out of toasting position.

In witness whereof I claim the foregoing as my invention, I hereunto append my signature this 31 day of March, 1924.

CHARLES S. ELLIS.